May 10, 1949.  J. S. NEWTON  2,469,743
LOCOMOTIVE REVERSING GEARING
Filed June 28, 1946  2 Sheets-Sheet 1

WITNESSES:
V. W. Novak
Anna A. Frapelli

INVENTOR
JOHN S. NEWTON
BY
A. B. R.
ATTORNEY

May 10, 1949.  J. S. NEWTON  2,469,743
LOCOMOTIVE REVERSING GEARING
Filed June 28, 1946  2 Sheets-Sheet 2

WITNESSES:

INVENTOR
JOHN S. NEWTON
BY
ATTORNEY

Patented May 10, 1949

2,469,743

UNITED STATES PATENT OFFICE 2,469,743

LOCOMOTIVE REVERSING GEARING

John S. Newton, Lansdowne, Pa., assignor to Westinghouse Electric Corporation, East Pittsburgh, Pa., a corporation of Pennsylvania Application June 28, 1946, Serial No. 680,117

4 Claims. (Cl. 192—4)

The invention relates to a unitary turbine and reduction gear set for propelling locomotives and the like, the turbine having a rotary member, and it has for an object to provide apparatus of this character having built-in reversing means comprising meshing reversing and ahead pinions whose axes are each spaced from the axis of a driven gear the same distance as the driven gear axis is spaced from the turbine rotary member axis and the ahead pinion being of larger diameter than the reversing pinion so that it may mesh with the driven gear and the reversing pinion be maintained out of mesh therewith, together with means for shifting the pinions circumferentially of the driven gear to align either one thereof with the turbine rotary member and for clutching the latter to the aligning pinion.

A further object of the invention is to provide a brake for the turbine apparatus of the above character and to provide for operation of the brake so that it is applied before each reversing operation begins and is released after the latter is completed.

A further object of the invention is to provide apparatus of the above character with abutments, which engage to define aligning positions of the pinions with the turbine rotary member, and such arrangement of the pinions with respect to the driven gear and the turbine rotary member that, for each direction of the gearing, lateral thrust of the latter is effective to exert engaging pressure on engaged abutments.

The foregoing and other objects are effected by the invention as will be apparent from the following description and claims taken in connection with the accompanying drawings, forming a part of this application, in which:

Figure 1:
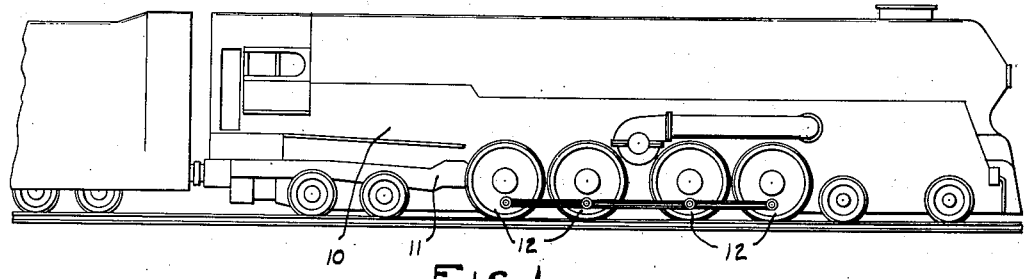
Fig. 1 is a side elevational view of a turbine-driven locomotive having the improved transmission.
Figure 2:
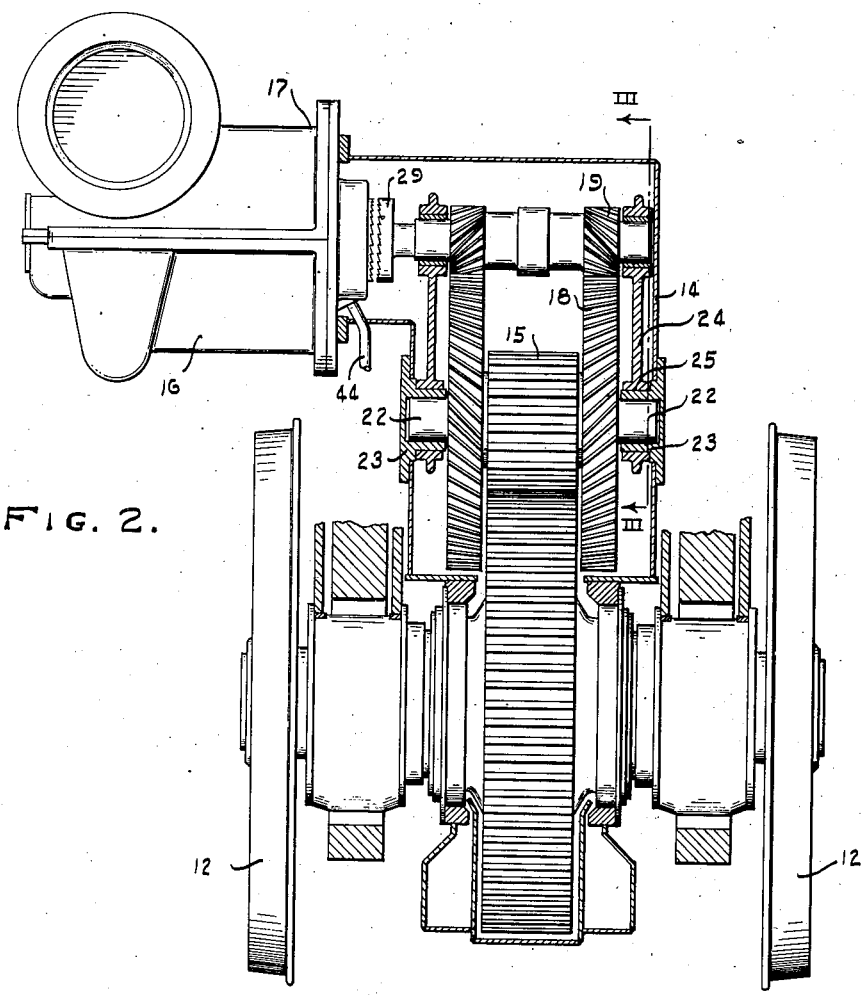
Fig. 2 is a sectional view of a turbine and reduction gear assembly having the improved built-in reversing means.
Figure 3:
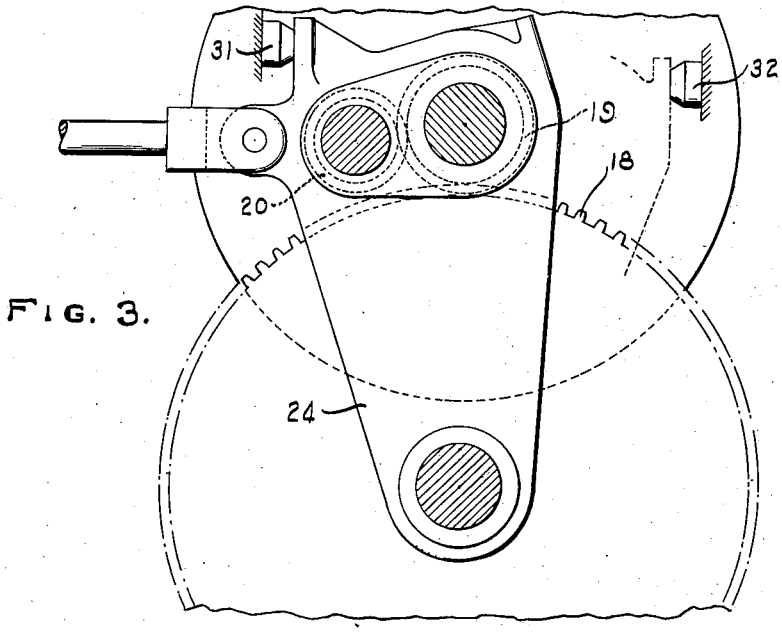
Fig. 3 is a sectional view taken along the line III—III of Fig. 2.
Figure 4:
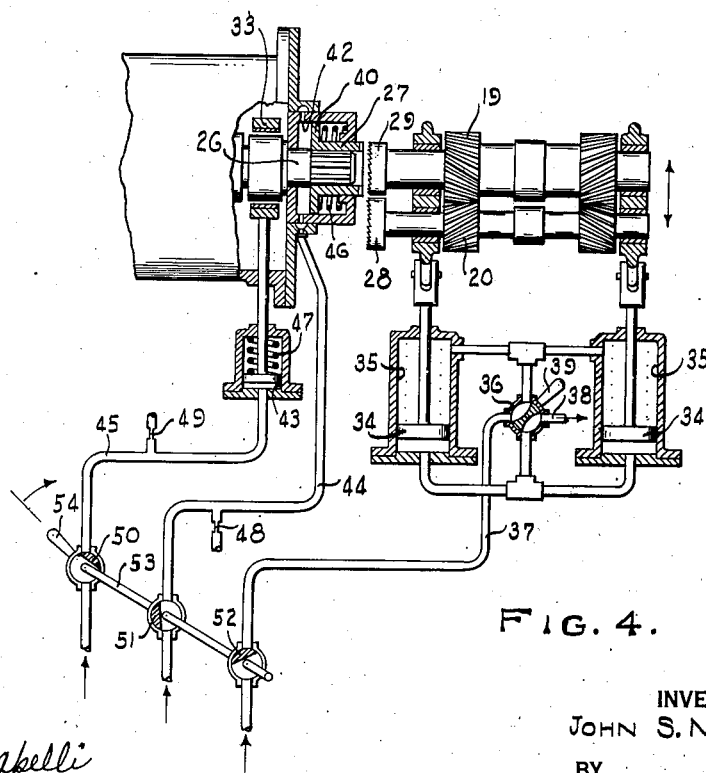
Fig. 4 is a diagrammatic view, partly in section, and showing means for operating the brake and clutch and shifting the pinions.

Referring to the drawing, there is shown a locomotive 10 having a frame 11 supported by wheels including driving wheels 12. The frame carries a casing 14 for reduction gearing 15 connecting the turbine 16 to the driving wheels 12. The turbine has one end of its casing 17 attached to the gear casing to constitute a unitary casing structure.

The reduction gear includes a driven gear 18, an ahead pinion 19 meshing therewith, and a reversing pinion 20 meshing with the ahead pinion. The driven gear has journals 22 mounted in bearings 23 provided by the casing. The pinions 19 and 20 are mounted on a carrier 24 journalled at 25, on the bearings 23.

The reversing pinion 20 is of smaller diameter than the ahead pinion 19 so that, with equal spacing of the pinion axes from the driven gear axis and of the turbine rotor or rotary member axis from the driven gear axis, either of the pinions may align axially with the turbine rotary member with the larger or ahead pinion maintained in mesh with the driven gear and the smaller or reversing pinion out of mesh therewith.

The turbine includes a rotary driving member 26 having a movable driving clutch member 27 keyed or splined thereto, and the reversing and ahead pinions are provided with driven clutch members 28 and 29. As the spacing of the turbine rotary driving member axis from the driven gear axis is the same as that of the latter from the reversing and ahead pinion axes, the carrier may be moved to align either pinion with the turbine rotary member; and, with either pinion in alignment, the clutch member 27 is caused to connect with the clutch member 28 or the clutch member 29, as the case may be.

With the turbine rotating in the same direction, connection of its clutch member 27 with the clutch member 28 results in driving the driven gear in a reverse direction and connection of such clutch member with the clutch member 29 results in driving thereof in the ahead direction.

The carrier has a range of movement limited by abutments 31 and 32 positioned so that, with the turbine rotating in the proper direction, the abutments take the torque reaction, that is, such torque reacts to apply engaging pressure to the engaged abutments.

The carrier is moved to align the pinions with the turbine rotor by any suitable shifting mechanism; and, with alignment of the rotor and one of the pinions, the driving clutch member is moved to connect with the pinion driven clutch member. As the driving clutch member should be moved to connect with and disconnect from a driven clutch member at zero speed, a brake 33 is preferably provided for the turbine rotary member.

Any suitable means may be used to apply the brake 33, to disconnect the driving clutch member from the driven clutch member of one pinion, to shift the carrier 24 to align the other pinion with the turbine rotary member, to connect the driving clutch member with the driven clutch member of the latter pinion, and to release the brake in sequence.

As shown, the carrier is shifted by double-acting pistons 34 in the cylinders 35 to which motive liquid is supplied and from which liquid is exhausted by a two-way valve 36 connected to the supply line 37 and to the drain connection 38, the valve being provided with an actuating handle 39.

Pistons 40 and 41 are connected, respectively, to the clutch member 27 and to the brake 33 for operation thereof, the pistons being arranged in the respective cylinders 42 and 43 to which motive liquid is supplied by the conduits 44 and 45 for clutch engagement and brake application. Springs 46 and 47 act on pistons 40 and 41 to release the clutch and brake, respectively, when the motive liquid supply conduits 44 and 45 are interrupted, such conduits preferably having bleeder drain orifices 48 and 49 providing for release with the desired rapidity.

Preferably, the hydraulic cylinders are controlled so as to obtain the following sequence of operations: Application of the brake, disengagement of the turbine rotor driving clutch member from one of the pinion driven clutch members, shifting of the carrier to align the other pinion with the turbine rotor, and releasing of the brake. To this end, there is shown an arrangement of valves 50, 51 and 52 for the conduits 45, 44 and 37, respectively, and connected to the shaft 53 having an operating handle 54. Assuming that one of the pinions is clutched to the turbine shaft and that the other pinion is to be clutched thereto, the desired pinion shift is preceded by operation of the valve handle 39 and then, with movement of the handle 54 in the direction of the arrow, the valve 50 is opened to apply the brake, continued movement closes the valve 51 to render the spring 45 effective to release the driving clutch member 27 from whichever of the pinion driven clutch members 28 or 29 it engages, and further movement opens the valve 52 to operate the pistons 34 to shift the pinion carrier, whereupon the handle 54 is moved back to operate the valves in reverse order, the valve 52 closing, followed by opening of the valve 51 to engage the clutch member 27 with the aligned pinion clutch member, and then the valve 50 is closed to render the spring 46 effective to release the brake.

While the invention has been shown in but one form, it will be obvious to those skilled in the art that it is not so limited, but is susceptible of various changes and modifications without departing from the spirit thereof.

What is claimed is:

1. In combination, propulsion means, a prime mover including a uni-directional rotary driving member; reversing reduction gearing for connecting the rotary driving member to the propulsion means; said gearing including a driven gear whose axis is parallel to the rotary driving member axis, a carrier pivoted about the driven gear axis, a pair of continuously meshing pinions rotatably mounted on the carrier with their axes maintained continuously fixed in relation to the carrier and equally spaced radially from the driven gear axis and one of the pinions being larger than the other so that the larger one continuously meshes with the driven gear and the smaller one is continuously out of mesh therewith; said pinions having such diameters that their axes are each spaced from the driven gear axis a radial distance which is the same as that between the rotary driving member and driven gear axes, whereby the carrier may be positioned to align either pinion axially with the rotary driving member; driven clutch members connected to the pinions; a driving clutch member connected to the rotary driving member and movable to connect with and disconnect from the driven clutch member of whichever of the pinions is in alignment with the rotary driving member; means for moving the driving clutch member; and means effective, with the driving clutch member disconnected from the driven clutch members, to shift the carrier to align either pinion with the rotary driving member.

2. Apparatus as claimed in claim 1 with abutments for limiting shifting of the carrier to positions for alignment of the pinions with the rotary driving member and the pinions having such relation to the driven gear and the rotary driving member that, for each direction of drive of the gearing, the driving torque is effective to exert engaging pressure on the engaging abutments.

3. Apparatus as claimed in claim 1 with a brake for the rotary driving member and means for operating the brake so that it is applied precedent to each reversing operation and is released after completion of the latter.

4. In combination, propulsion means; a prime mover including a uni-directional rotary driving member; reversing gearing for connecting said rotary driving member to the propulsion means; a casing structure for the prime mover and the gearing and provided with bearings therefor; said gearing including a driven gear carried by a pair of said bearings arranged so that the gear axis is parallel to the rotary driving member axis, a carrier journalled on the bearings of said pair in coaxial relation with the driven gear axis, a pair of continuously meshing pinions rotatably mounted on the carrier with their axes maintained continuously fixed in relation to the carrier and equally spaced radially from the driven gear axis and one of the pinions being larger than the other so that the larger one continuously meshes with the driven gear and the smaller one is continuously out of mesh therewith; said pinions having such diameters that their axes are each spaced from the driven gear axis a radial distance which is the same as that between the rotary driving member and driven gear axes, whereby the carrier may be positioned with either pinion in axial alignment with the rotary driving member; driven clutch members connected to the pinions; a driving clutch member connected to the rotary driving member and movable for connection with and disconnection from the driven clutch member of whichever pinion aligns with the rotary driving member; spaced abutments carried by the casing and engageable by abutments on the carrier to define aligning positions of the pinions with the turbine rotary member; the pinions having such relation to the gear and the rotary driving member that, for each direction of drive of the gearing, the driving torque is effective to exert engaging pressure on the engaged abutments; means for shifting the carrier from engagement with one casing abutment to engagement with the other casing abutment and vice versa; a brake for the rotary driving member; and means operative to apply the brake, to disconnect the driving clutch member from the driven clutch member of the aligned pinion, to shift the carrier to align the other pinion with the rotary driving member, to connect the driving clutch member with the driven clutch member of the latter pinion, and to release the brake in sequence.

JOHN S. NEWTON.

REFERENCES CITED

The following references are of record in the file of this patent:

UNITED STATES PATENTS

| Number | Name | Date |
| --- | --- | --- |
| 965,408 | Reno | July 26, 1910 |
| 1,614,203 | Ljungstrom | Jan. 11, 1927 |
| 1,614,204 | Ljungstrom | Jan. 11, 1927 |
| 2,078,128 | Doran | Apr. 20, 1937 |

FOREIGN PATENTS

| Number | Country | Date |
| --- | --- | --- |
| 424,993 | Germany | Feb. 10, 1926 |